United States Patent
Shin et al.

(10) Patent No.: US 12,494,214 B2
(45) Date of Patent: Dec. 9, 2025

(54) SALIENCY-BASED MIXED-ORDER AMBISONICS ENCODING OF MULTIPLE SOUND SOURCES FOR IMMERSIVE SPATIAL AUDIO

(71) Applicant: GOOGLE LLC, Mountain View, CA (US)

(72) Inventors: Dongeek Shin, San Jose, CA (US); Tianyu Xu, Mountain View, CA (US); Jennifer Irturk, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 229 days.

(21) Appl. No.: 18/360,476

(22) Filed: Jul. 27, 2023

(65) Prior Publication Data

US 2025/0037725 A1  Jan. 30, 2025

(51) Int. Cl.
| | |
|---|---|
| G10L 19/008 | (2013.01) |
| G02B 27/01 | (2006.01) |
| G06T 19/00 | (2011.01) |
| G10L 19/022 | (2013.01) |

(52) U.S. Cl.
CPC ........ *G10L 19/008* (2013.01); *G02B 27/017* (2013.01); *G06T 19/006* (2013.01); *G10L 19/022* (2013.01)

(58) Field of Classification Search
None
See application file for complete search history.

(56) References Cited

U.S. PATENT DOCUMENTS

| | | | | |
|---|---|---|---|---|
| 8,396,282 B1* | 3/2013 | Huber | ................... | G06F 18/253 |
| | | | | 382/153 |
| 2002/0091671 A1* | 7/2002 | Prokoph | ............. | G06F 16/9538 |
| | | | | 707/E17.084 |
| 2005/0281410 A1* | 12/2005 | Grosvenor | ............. | H04H 60/47 |
| | | | | 381/61 |
| 2013/0342539 A1* | 12/2013 | Khan | ...................... | G06T 11/00 |
| | | | | 345/440 |
| 2017/0364752 A1* | 12/2017 | Zhou | .................... | G06V 10/462 |
| 2019/0007781 A1 | 1/2019 | Peters et al. | | |
| 2021/0004589 A1* | 1/2021 | Turkelson | ........ | G06V 30/19173 |
| 2022/0197592 A1 | 6/2022 | Dickins et al. | | |
| 2022/0201418 A1* | 6/2022 | Salehin | ................ | G10L 19/167 |
| 2025/0037725 A1* | 1/2025 | Shin | ..................... | G02B 27/017 |

OTHER PUBLICATIONS

Chao, et al., "Towards Audio-Visual Saliency Prediction for Omni-directional Video With Spatial Audio", https://ieeexplore.ieee.org/document/9301766, Dec. 29, 2020, 5 pages.

Frank, et al., "Producing 3D Audio in Ambisonics", AES 57th International Conference; https://www.aes.org/e-lib/browse.cfm?elib=17605, Mar. 6, 2015, 9 Pages.

* cited by examiner

*Primary Examiner* — Peter Vincent Agustin
(74) *Attorney, Agent, or Firm* — Brake Hughes Bellermann LLP (57) ABSTRACT

Described techniques enable the use of ambisonics encoding/decoding for spatially accurate sound reproduction that is low-latency and that conserves computational and battery resources. Different sounds sources may be encoded using different ambisonics encoding orders, with higher order encoding being used to process sound from a sound source of current attention of a user, and lower order encoding being used to process other sound sources, such as background sound sources.

20 Claims, 9 Drawing Sheets

SALIENCY-BASED MIXED-ORDER AMBISONICS ENCODING OF MULTIPLE SOUND SOURCES FOR IMMERSIVE SPATIAL AUDIO

TECHNICAL FIELD

This description relates to sound generation for wearable devices.

BACKGROUND

Three-dimensional (3D) audio techniques for wearable devices attempt to generate spatially accurate sound experiences by algorithmically modulating the binaural speaker sounds produced by speakers of the wearable devices. For example, channel-based rendering techniques generate audio events at fixed, pre-defined speaker locations of real or virtual speakers. In other examples, object-based rendering techniques generate individual audio events with corresponding coordinates of a spatial domain.

Another example technique, known as ambisonics, utilizes a two-step process in which received sound signals are mapped (encoded) to intermediate spherical harmonic representations, which are then spatially mapped (decoded) to a desired or available arrangement of output speakers. Ambisonics has been used for immersive applications, such as virtual reality (VR), because the decoupling of encoding and decoding enables an experience of 360° sound for a user wearing a VR headset.

SUMMARY

In a general aspect, a computer program product is tangibly embodied on a non-transitory computer-readable storage medium and comprises instructions. When executed by at least one computing device (e.g., by at least one processor of the computing device), the instructions are configured to cause the at least one computing device to represent a first sound source at a first orientation and a second sound source at a second orientation within a spatial region defined with respect to a wearable device, receive a first sound at the wearable device from the first sound source, and receive a second sound at the wearable device from the second sound source. The instructions, when executed by the at least one computing device, may further cause the at least one computing device to perform a first ambisonics encoding of the first sound, perform a second ambisonics encoding of the second sound that is a lower order than the first ambisonics encoding, render the first sound at the first orientation within the spatial region, based on the first ambisonics encoding, and render the second sound at the second orientation within the spatial region, based on the second ambisonics encoding.

In another general aspect, a wearable device includes at least one frame for positioning the wearable device on a body of a user, at least one display, binaural speakers, at least one processor, and at least one memory storing instructions. When executed, the instructions cause the at least one processor to represent, using the at least one display, a first sound source at a first orientation and a second sound source at a second orientation within a spatial region defined with respect to the wearable device, receive a first sound at the wearable device from the first sound source, and receive a second sound at the wearable device from the second sound source. When executed, the instructions cause the at least one processor to perform a first ambisonics encoding of the first sound, perform a second ambisonics encoding of the second sound that is a lower order than the first ambisonics encoding, render, using the binaural speakers, the first sound at the first orientation within the spatial region, based on the first ambisonics encoding, and render, using the binaural speakers, the second sound at the second orientation within the spatial region, based on the second ambisonics encoding.

In another general aspect, a method includes representing a first sound source at a first orientation and a second sound source at a second orientation within a spatial region defined with respect to a wearable device, receiving a first sound at the wearable device from the first sound source, and receiving a second sound at the wearable device from the second sound source. The method further includes performing a first ambisonics encoding of the first sound, performing a second ambisonics encoding of the second sound that is a lower order than the first ambisonics encoding, rendering the first sound at the first orientation within the spatial region, based on the first ambisonics encoding, and rendering the second sound at the second orientation within the spatial region, based on the second ambisonics encoding.

The details of one or more implementations are set forth in the accompanying drawings and the description below. Other features will be apparent from the description and drawings, and from the claims.

DETAILED DESCRIPTION

Described systems and techniques enable accurate and realistic sound generation for wearable devices, while conserving computational resources, improving battery life, and reducing processing latency. As a result, for example, user participation in co-presence, live presence, or telepresence interactions may be enabled or enhanced.

For example, a user may utilize a wearable device to interact with multiple other users, who may be remote from the user and interacting with the user, and with one another, using separate wearable devices. In other words, a plurality of local/remote participants may interact using wearable devices to simulate an experience of being co-located with one another. For example, such interactions may occur in order to conduct a meeting, to play a game, or to experience an event.

In these and similar scenarios, visual representations of the various users and other sources of sound may be spatially positioned within a common coordinate system. For example, representations of the various users, also referred to as virtual users, may be positioned within a real or virtual room.

Ambisonics techniques, referred to above, may be used to spatially represent sound sources within such virtual environments, for example, to extend the audio-visual illusion of co-presence provided by the users' wearable devices. For example, a virtual user positioned to the left of a user will be experienced by the user as generating sound from that direction, while a virtual user positioned to the right of the user will be experienced as generating sound from that direction. More generally, such a user may experience virtual sound sources from directions above, below, in front of, or behind the user.

As also noted above, ambisonics involves mapping or encoding received sound signals to intermediate spherical harmonic representations. In other words, much like Fourier transforms map a waveform into sinusoids of different frequencies, ambisonics map a sound signal into spherical harmonics of different orders, where the orders refer to a number and shape(s) of the spherical harmonics. Higher order spherical harmonics require more processing time and process resources than lower order spherical harmonics and produce higher levels of spatial accuracy.

Some conventional techniques use a technique known as mixed-order ambisonics, in which an ambisonics signal set is defined with non-uniform resolution that varies with source direction. For example, some spherical harmonics of an ambisonics encoding may be omitted or dropped from the encoding so as to capture sound primarily from a horizontal direction, e.g., when sound sources from a vertical direction are of secondary importance.

In the present description, as referenced above and described in more detail, below, different sound sources are encoded differently based on a detected relevance of each sound source to a user for whom sounds from the different sound sources are being rendered. For example, in the type of telepresence scenarios referenced above, a user interacting with multiple virtual users may consider sound from a first virtual user to be more relevant or more important than sound from a second virtual user (or other sound sources within the telepresence environment).

Then, described techniques may encode the sound from the first virtual user using a higher-order ambisonics encoding, while sound from the second virtual user may be encoded using a lower-order ambisonics encoding. Consequently, computational and battery resources may be conserved, and latency may be improved. At the same time, the user may be prevented from perceiving a meaningful reduction in quality of the telepresence experience, because the second virtual user or other secondary sound source may have been determined to be of lower importance than sound from the first virtual user.

Figure 1:
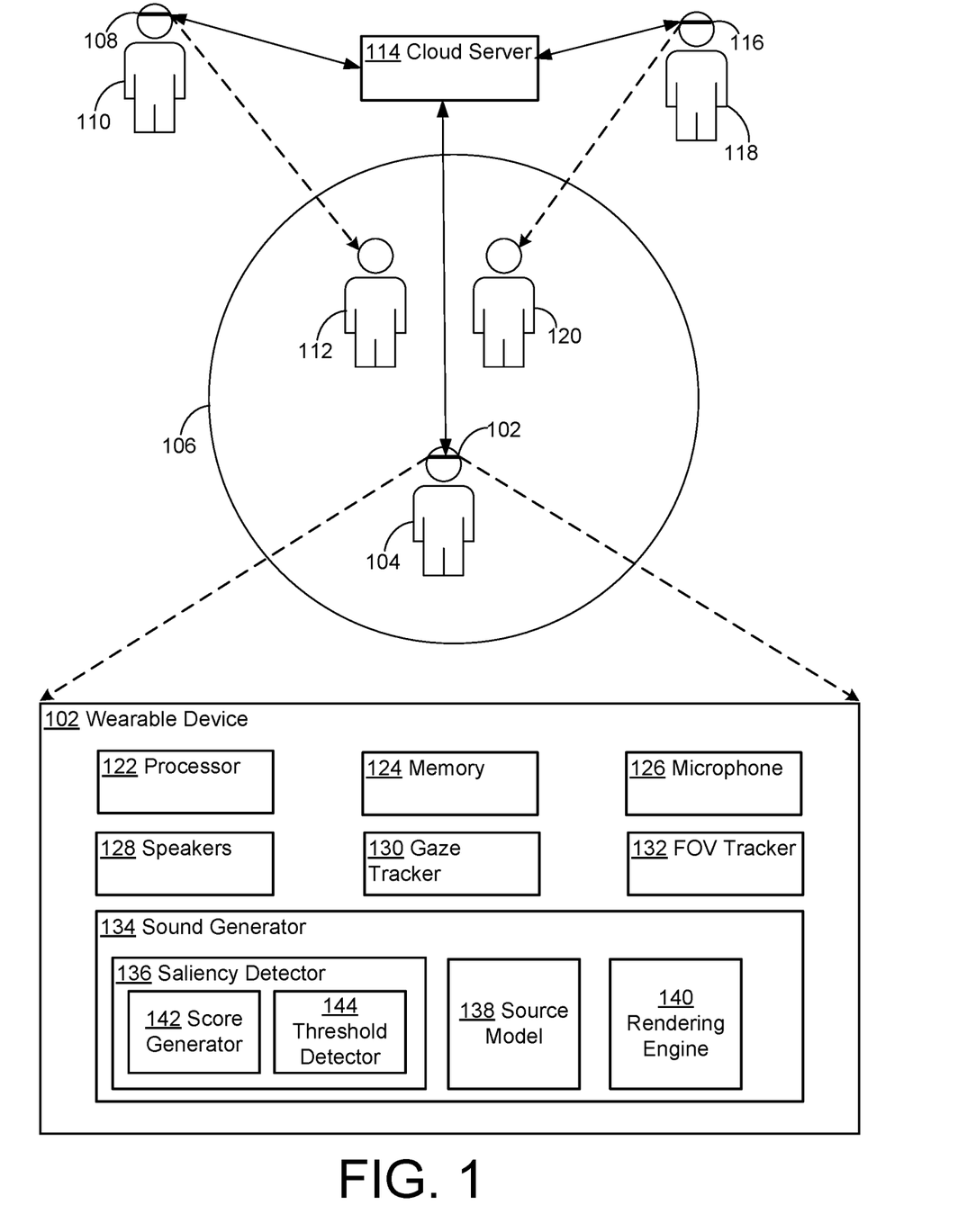
FIG. 1 is a block diagram of a system for saliency-based mixed order ambisonics encoding of multiple sound sources for immersive spatial audio.

FIG. 1 is a block diagram of a system for saliency-based mixed order ambisonics encoding of multiple sound sources for immersive spatial audio. In the example of FIG. 1, a wearable device 102 is illustrated as being worn by a user 104 within a spatial region 106. A wearable device 108 worn by a user 110 enables the providing of a virtual representation of the user 110, referred to herein as a virtual user 112, within the spatial region 106. For example, as shown, a cloud server 114 may be in communication with the wearable device 102 and the wearable device 108 to enable rendering of the virtual user 112. Similarly, a wearable device 116 worn by a user 118, through interactions with the cloud server 114 and/or the wearable device 102, enables the providing of a virtual representation of the user 118, referred to herein as a virtual user 120, within the spatial region 106.

In FIG. 1, the wearable device 102 may represent one or more wearable devices, including two or more wearable devices that are in communication with one another. For example, the wearable device 102 may represent a head-mounted device (HMD), such as smartglasses or smart goggles, or suitable HMD. Additional examples of wearable devices, including various types of HMDs, smartwatches, smart ear buds, and various other wearable devices, are provided below with respect to FIGS. 7 and 8. The wearable devices 108, 116 may similarly represent any such device, or combination of devices.

The spatial region 106 may represent a coordinate space of any physical or virtual location, or combination thereof, that may be defined with respect to the wearable device 102. For example, the spatial region 106 may represent coordinates within a physical space such as a room, an arena, or an outdoor space, or within a virtual space, which could include virtually any virtual location capable of being rendered by the wearable device 102. The spatial region 106 may also represent a common coordinate system that is applied across both a physical and virtual environment. More specific examples of the spatial region are provided below, e.g., with respect to FIGS. 4 and 5, or would be apparent.

The simplified example of FIG. 1 is provided from a point of view of the user 104, such that the virtual user 112 and the virtual user 120 are provided with respect to the spatial region 106. It will be appreciated that the user 110 may also use the wearable device 108 to provide a virtual representation of the user 118, and of the user 104, within a spatial region defined with respect to the wearable device 108 (perhaps in coordination with calculation of the spatial region 106). Similar comments apply to the user 118 and the wearable device 116, so that all three of the users 104, 110, 118 may be provided with an experience of being virtually co-located with one another, such as described below with respect to the example of FIG. 5.

In order to facilitate implementation of the experience of virtual co-location, it is desirable (among other implementation aspects) to coordinate both a visual and auditory presentation of the virtual user 112 and the virtual user 120 with respect to the spatial region 106, and to the user 104. In other words, for example, the user 104 should see the virtual user 112 and the virtual user 120 at known angles, positions, or other orientations defined with respect to the spatial region 106, and thus with respect to the wearable device 102, and should hear audio produced by the user 110 and the user 118 as emanating from the virtual user 112 and the virtual user 120, respectively.

As referenced above, it is possible for the wearable device 102 to provide such spatially accurate audio using known ambisonics techniques. Such an approach, however, may consume computing resources of the wearable device 102 at an undesirable rate, or to an undesirable extent.

For example, as shown in the exploded view of FIG. 1, the wearable device 102 may include a processor 122 (which may represent one or more processors), as well as a memory 124 (which may represent one or more memories (e.g., non-transitory computer readable storage media)). Although not shown separately in FIG. 1, the wearable device 102 may also include a battery, which may be used to power operations of the processor 122, the memory 124, and various other resources of the wearable device 102. More detailed examples of the device 102 and various associated hardware/software resources are provided below, e.g., with respect to FIGS. 7, 8A, and 8B.

For purposes of the simplified example of FIG. 1, the wearable device 102 should be further understood to include a microphone 126 and speakers 128, to enable two-way audio communications between the user 104 and the users 110, 118. For example, the speakers 128 may represent left ear/right ear speakers provided to the user 104 using, e.g., arms of a pair of smartglasses, a pair of earbuds, or any pair of left/right speakers that may be positioned at left/right ears of the user 104.

The wearable device 102 may include, or have access to, various sensors that may be used to detect, infer, or otherwise determine an attention of the user 104 with respect to the virtual user 112, the virtual user 120, or any real or virtual object within the spatial region 106. For example, in FIG. 1, the wearable device 102 includes a gaze tracker 130, which may be used to detect eye activity of the user 104 and thereby determine where the user 104 is looking or focusing. For example, gaze tracking may measure a point of gaze and/or a motion of an eye relative to a head of the user 104. Thus, gaze tracking may also be referred to, or include, eye tracking.

A field of view (FOV) tracker 132 may similarly be used to determine an attention of the user 104 within the spatial region 106. For example, when the wearable device 102 represents smartglasses or other HMD, the FIV tracker 132 may refer to hardware and associated software that tracks a relative motion of a head of the user 104. For example, the FOV tracker 132 may include, or utilize, an accelerometer, magnetometer, gyroscope, or combination thereof (e.g., an inertial measurement unit (IMU)) to determine a motion of a head of the user 104.

In the following description, the gaze tracker 130, the FOV tracker 132, other sensors, or combinations thereof, may be referred to as attention sensors, which may be utilized, as just referenced, to determine an attention of the user 104 within the spatial region 106. In particular, such attention sensors may be used to distinguish whether the user 104 is currently looking in a direction of the virtual user 112, as compared to the virtual user 120. More generally, as described with below with respect to the example of FIG. 4, such attention sensors may be used to distinguish an attention of the user 104 with respect to any audio that exists and/or is reproduced within the spatial region 106, including a plurality of speakers, any type of background noise, or any sound source to be produced by the speakers 128.

Accordingly, a sound generator 134 may leverage information obtained from such attention sensors to produce 3D audio, using the speakers 128, in a manner that provides a spatially-accurate sound experience for the user 104, while at the same time conserving available computing resources. For example, the sound generator 134 may include a saliency detector 136 that is configured to determine a relative saliency of each of a plurality of sound sources (including, e.g., audio from each of the users 110, 118), based on outputs of attention sensors such as the gaze tracker 130 and the FOV tracker 132.

Then, a source model 138 may be configured to provide the types of scene-based encoding referenced above, in which sounds are projected into an ambisonics sound field representation and then sampled for an aggregated reproduction within the spatial region 106 using a rendering engine 140. As also referenced above, it is possible for the source model 138 to use such ambisonics techniques to provide a fully immersive, 360 degrees, 3D audio experience for the user 104, even when a large number of sound sources are reproduced. For example, ambisonics encodings of arbitrarily high order may be used to obtain highly realistic audio reproductions.

Obtaining desired audio qualities by increasing an order of ambisonics encodings may be undesirable, however, particularly when multiple sound sources are present. For example, providing such high order ambisonics encoding for multiple sound sources may consume undesirably large quantities of available computing and/or battery resources of the wearable device 102. Moreover, such high order ambisonics encoding for multiple sound sources may require a processing delay that imparts unacceptable latencies and delays in the types of real-time communications depicted in the example of FIG. 1.

By using the saliency detector 136, however, the source model 138 may be configured to implement and utilize relatively higher-order ambisonics encodings for sound source(s) determined to be highly salient for the user 104, while using relatively lower-order ambisonics encodings for sound source(s) determined to be less salient for the user 104. Consequently, any degradation of sounds less salient for the user 104 may be unlikely to be noticed or missed by the user 104 when rendered by the rendering engine 140. At the same time, significant reductions of computational complexity and/or rendering latency may be obtained, while conserving or increasing the battery life of the wearable device 102. Accordingly, an overall experience of the user 104 may be improved.

Put another way, the sound generator 134 of FIG. 1 enables use of higher order ambisonics encodings for relatively more salient sound sources, and lower order ambisonics encodings for relatively less salient sound sources. In FIG. 1, the user 104 is interacting with only the two sound sources associated with the virtual user 112 and the virtual user 120. As described in more detail below, however, the sound generator 134 may determine relative levels of saliency (and associated ambisonics encoding orders) among three or more sound sources, as well.

Moreover, such relative levels of saliency may be determined in real time, based on actions of the user 104. For example, in the simplified example of FIG. 4, the user 104 may gaze at the virtual user 112 at a first time and while the user 110 is speaking, and then at the virtual user 120 at a second time and while the user 118 is speaking. Accordingly, the sound generator 134 may encode speech of the virtual user 112 (user 110) with a relatively higher order ambisonics encoding than that used to encode speech of the virtual user 120 (user 118) at the first time, and may encode speech of the virtual user 120 (user 118) with a relatively higher order ambisonics encoding than that used to encode speech of the virtual user 112 (user 110) at the second time.

The saliency detector 136 may be implemented using various techniques. In the example of FIG. 1, the saliency detector 136 is illustrated as including a score generator 142, which may be configured to generate a saliency score for each sound source being rendered for the user 104. For example, as referenced above, the score generator 142 may receive input from the gaze tracker 130 and/or the FOV tracker 132, and may generate a saliency score for each such sound source.

For example, the FOV tracker 132 may determine one or more sound sources within a FOV of the user 104, and may designate any other sound sources as generating background sounds to be assigned relatively lower order ambisonics encoding. The score generator 142 may match a gaze angle of the user 104 to each sound source, and assign a relatively higher order ambisonics encoding to the sound source that most closely matches the gaze angle.

As already noted, the sound generator 134 is not limited to processing the two sound sources of FIG. 1, and may assign saliency scores to three or more sound sources. That is, for example, each of three sound sources may be assigned a different saliency score, and may each be processed using a different order of ambisonics encoding.

In other examples, a threshold detector 144 may be used to compare saliency scores of the score generator 142 to a threshold, which may be pre-determined or dynamically determined. For example, all sound sources above a saliency threshold may be assigned a first (relatively higher order) ambisonics encoding, while all sound sources below the saliency threshold may be assigned a second (relatively lower order) ambisonics encoding.

Additional or alternative example implementations of the sound generator 134 are described below, or would be apparent. The sound generator 134 may be implemented as one or more software module(s). That is, for example, the memory 124 may be used to store instructions that are executable by the processor 122, which, when executed, cause the processor 122 to implement the sound generator 134 as described herein. As referenced above, and described in more detail, below, with respect to FIG. 7, the sound generator 134 may be implemented entirely on the wearable device 102, and/or using a combination of wearable devices, and/or using a remote server (such as the cloud server 114).

Figure 2:
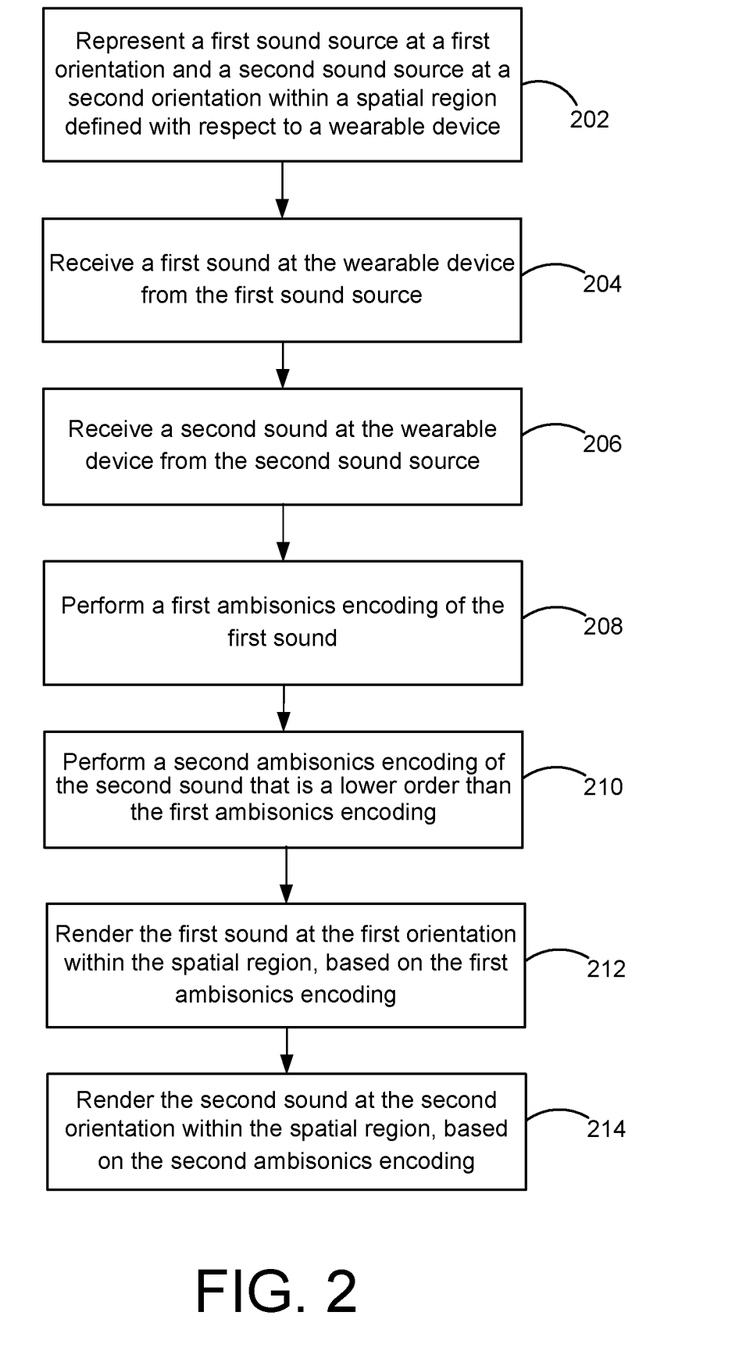
FIG. 2 is a flowchart illustrating example operations of the system of FIG. 1.

FIG. 2 is a flowchart illustrating example operations of the system of FIG. 1. In the example of FIG. 2, operations 202-14 are illustrated as separate, sequential operations. However, in various example implementations, the operations 202-214 may be implemented in a different order than illustrated, in an overlapping or parallel manner, and/or in a nested, iterative, looped, or branched fashion. Further, various operations or sub-operations may be included, omitted, or substituted.

In FIG. 2, a first sound source may be represented at a first orientation and a second sound source may be represented at a second orientation within a spatial region defined with respect to a wearable device (202). For example, in FIG. 1, the user 110 may illustrate a first sound source, while the user 118 may illustrate a second sound source, so that the virtual user 112 represents the first sound source and the virtual user 120 represents the second sound source for the user 104 of the wearable device 102. Thus, a representation of a sound source may be understood to include a visual rendering indicating or referencing the corresponding sound source.

In other examples, such representations need not be visually rendered by the wearable device and/or may not be visually rendered in a one-to-one relationship with corresponding sound sources. For example, the wearable device 102 may define the representation of a sound source within a coordinate system of the spatial region 106 without visual rendering of the representation. For example, a sound source that is associated with a portion of the spatial region 106 that is outside of a FOV of the user 104 need not be visually rendered by the wearable device, but may nonetheless be represented as occurring at a point within the spatial region 106 by the wearable device. In other examples, multiple sound sources represented outside of a FOV of the user 104 may be represented as a single sound source that is treated as aggregate background noise.

The spatial region 106 may refer to a physical region, such as a room, and/or may refer to a virtual region. For example, the wearable device may include a virtual reality (VR) device, and the spatial region 106 may include a virtual spatial region generated by the VR device. More generally, the wearable device may refer to any device used for augmented reality, mixed reality, immersive reality, or extended reality.

A first sound may be received at the wearable device from the first sound source (204). For example, the wearable device 102 may receive first audio from the user 110, via the cloud server 114.

Similarly, a second sound may be received at the wearable device from the second sound source (206). For example, the wearable device 102 may receive second audio from the user 118, via the cloud server 114.

As described with respect to FIG. 1, a saliency score may be assigned to the first sound source and to the second sound source, e.g., by the saliency detector 136. As also described, such saliency scores may be assigned based on gaze tracking, FOV tracking, or other measures or characterizations of an attention of the user 104 with respect to the virtual user 112 and the virtual user 120.

A first ambisonics encoding of the first sound may be performed (208). For example, if an attention of the user 104 is determined to be directed towards the virtual user 112 (so that the virtual user 112 is assigned a relatively high saliency score), the source model 138 may perform ambisonics encoding of audio from the user 110 at a relatively high order. Such encoding operations may require relatively more computing resources, battery resources, and time resources, the consumption of which may be justified by improving an audio experience of the user 104 with respect to the sound source that is currently most important to the user 104.

A second ambisonics encoding of the second sound may be performed that is a lower order than the first order ambisonics encoding (210). For example, the first ambisonics may be a fourth order ambisonics encoding when the second order ambisonics encoding is a third order ambisonics encoding, or the first ambisonics may be a fifth order ambisonics encoding when the second order ambisonics encoding is a fourth order ambisonics encoding.

For example, continuing the above example, if the attention of the user 104 is determined to be directed towards the virtual user 112, the virtual user 120 may be assigned a relatively low saliency score. Then, the source model 138 may perform ambisonics encoding of audio from the user 118 at a relatively low order. Such encoding operations may require relatively less computing resources, battery resources, and time resources, and may result in lower quality audio rendering (e.g., not as spatially accurate within the spatial region 106). Nonetheless, such relatively lower quality may be acceptable to the user 104 with respect to the sound source that is currently less important to the user 104.

The first sound may be rendered at the first orientation within the spatial region, based on the first ambisonics encoding (212). For example, the rendering engine 140 may render sound from the user 110 at a first orientation within the spatial region 106 that corresponds to a position of the virtual user 112 within the spatial region 106.

Similarly, the second sound may be rendered at the second orientation within the spatial region, based on the second ambisonics encoding (214). For example, the rendering engine 140 may render sound from the user 118 at a second orientation within the spatial region 106 that corresponds to a position of the virtual user 120 within the spatial region 106.

Figure 3:
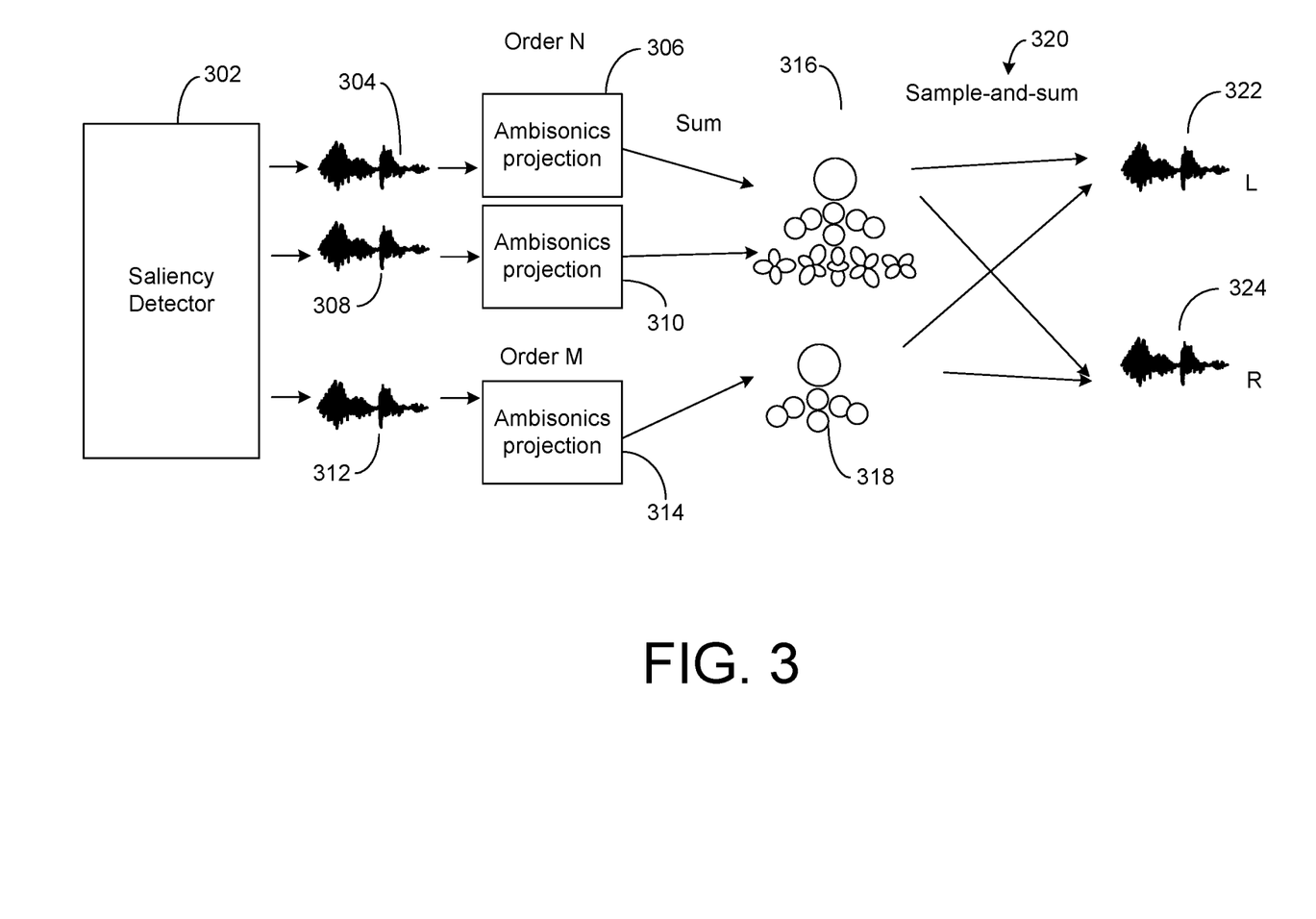
FIG. 3 is a block diagram of a more detailed example of a sound generator of the system of FIG. 1.

FIG. 3 is a block diagram of a more detailed example of a sound generator of the system of FIG. 1. In FIG. 3, a saliency detector 302 assigns saliency scores to an audio signal 304, an audio signal 308, and an audio signal 312. That is, each of the audio signals 304, 308, 312 may be associated with a corresponding sound source (e.g., remote user) and sound source representation (e.g., virtual user).

At a given point in time in FIG. 3, assigned saliency scores may dictate that the audio signals 304, 308 are both encoded with a relatively higher order ambisonics encoding. As shown, the audio signal 304 (e.g., WAV file) may be subjected to ambisonics encoding of a relatively high order "N", resulting in an ambisonics projection 306. Similarly, the audio signal 308 (e.g., WAV file) may be subjected to ambisonics encoding of relatively high order "N", resulting in an ambisonics projection 310. Meanwhile, the audio signal 312 (e.g., WAV file), associated with a lower saliency score, may be subjected to ambisonics encoding of a relatively low order "M", resulting in an ambisonics projection 314.

Then, the ambisonics projection 306 and the ambisonics projection 310 may be summed to obtain an aggregated ambisonics projection 316. In the example, the ambisonics projection 314 is a single ambisonics projection that is not required to be summed. Summed ambisonics projection 316 and ambisonics projection 318 are illustrated using spherical harmonic components that represent an order of the ambisonics encoding being used. In the example, the higher order ambisonics projection 316 is a third order ambisonics projection, while the relatively lower order ambisonics projection 318 is a second order ambisonics projection.

As shown, operations 320 may be performed, e.g., by the rendering engine 140, to execute a spatial sampling of aggregations of the ambisonics projections 316, 318. In this way, a left (L) ear signal 322 and a right (R) ear signal 324 may be obtained, to thereby provide a binaural output suitable for use with the speakers 128 (e.g., headphones, or earbuds) of the wearable device 102.

Figure 4:
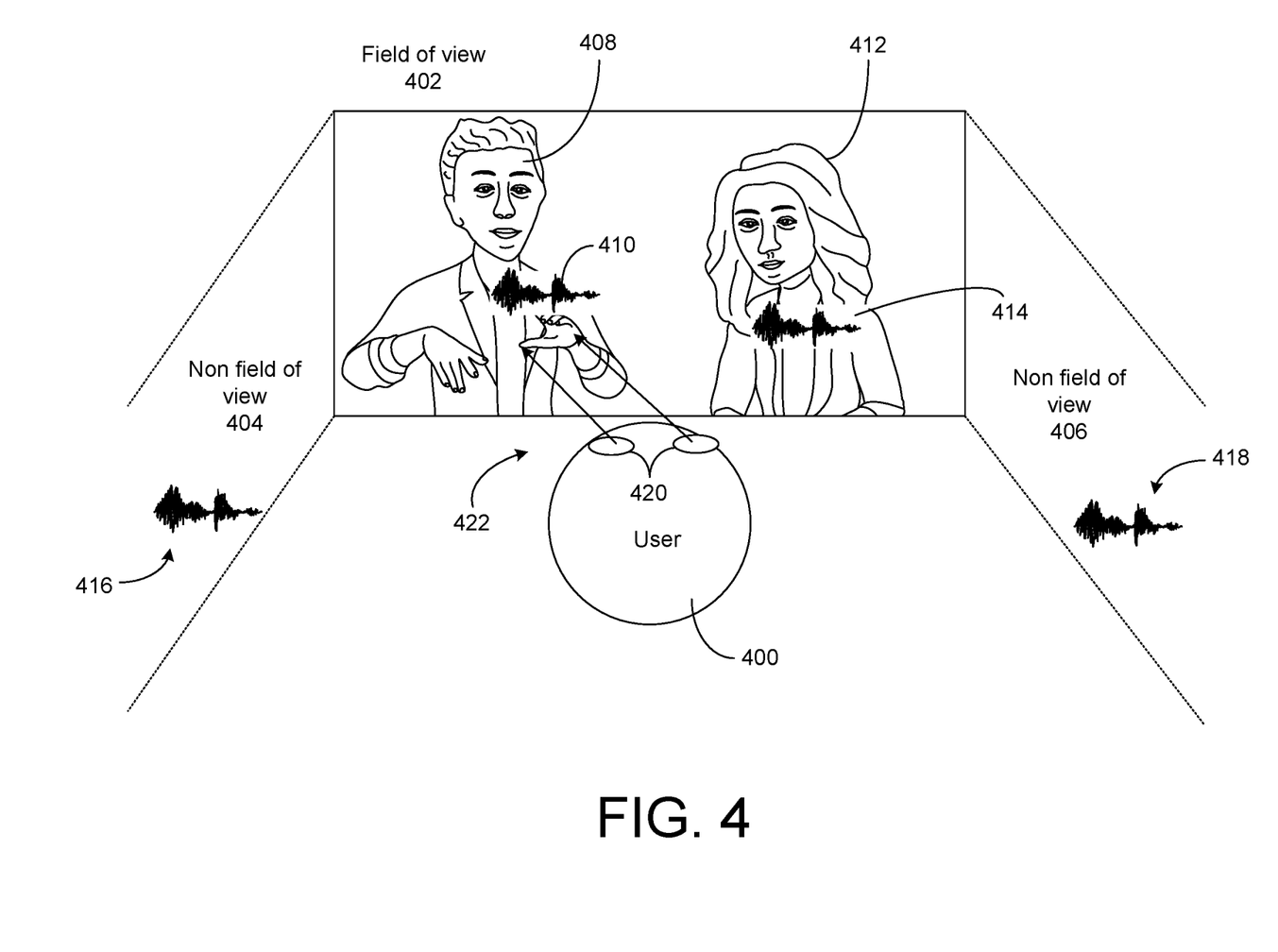
FIG. 4 illustrates a first example use case scenario for the system of FIG. 1.

FIG. 4 illustrates a first example use case scenario for the system of FIG. 1. In the example of FIG. 4, a user 400 has a field of view 402, so that a first area 404 outside the field of view 402 and a second area 406 outside the field of view 402 are defined. As further illustrated, the field of view 402 includes a representation 408 of a speaker who is the source of an audio signal 410. The field of view 402 further includes a representation 412 of a speaker who is the source of an audio signal 414. Further, an audio signal 416 and an audio signal 418 are received from outside the field of view 402.

In the example, a saliency score may be calculated as: Saliency_score=a*f_gaze(sound_source)+(1−a)*f_FOV (sound_source), in which 'a' is a value between 0 and 1 to ensure a convex combination between gaze tracking and FOV scores. Thus, a saliency score between 0 and 1 may be obtained, so that, for example, the audio signal 410 may have a higher saliency score (e.g., saliency score=1.0) then the audio signal 414 (e.g., saliency score=0.8), because both the representation 408 and the representation 412 are within the field of view, but a gaze 420 is tracked as having a direction 422 indicating attention paid primarily to the representation 408. Meanwhile, the audio signals 416, 418 may have much lower saliency scores (e.g., 0.3), because they are both originating from outside the field of view 402. Of course, the above formula and associated values are intended merely by way of example, and are not limiting of various other formulas that may be used to determine saliency.

Figure 5:
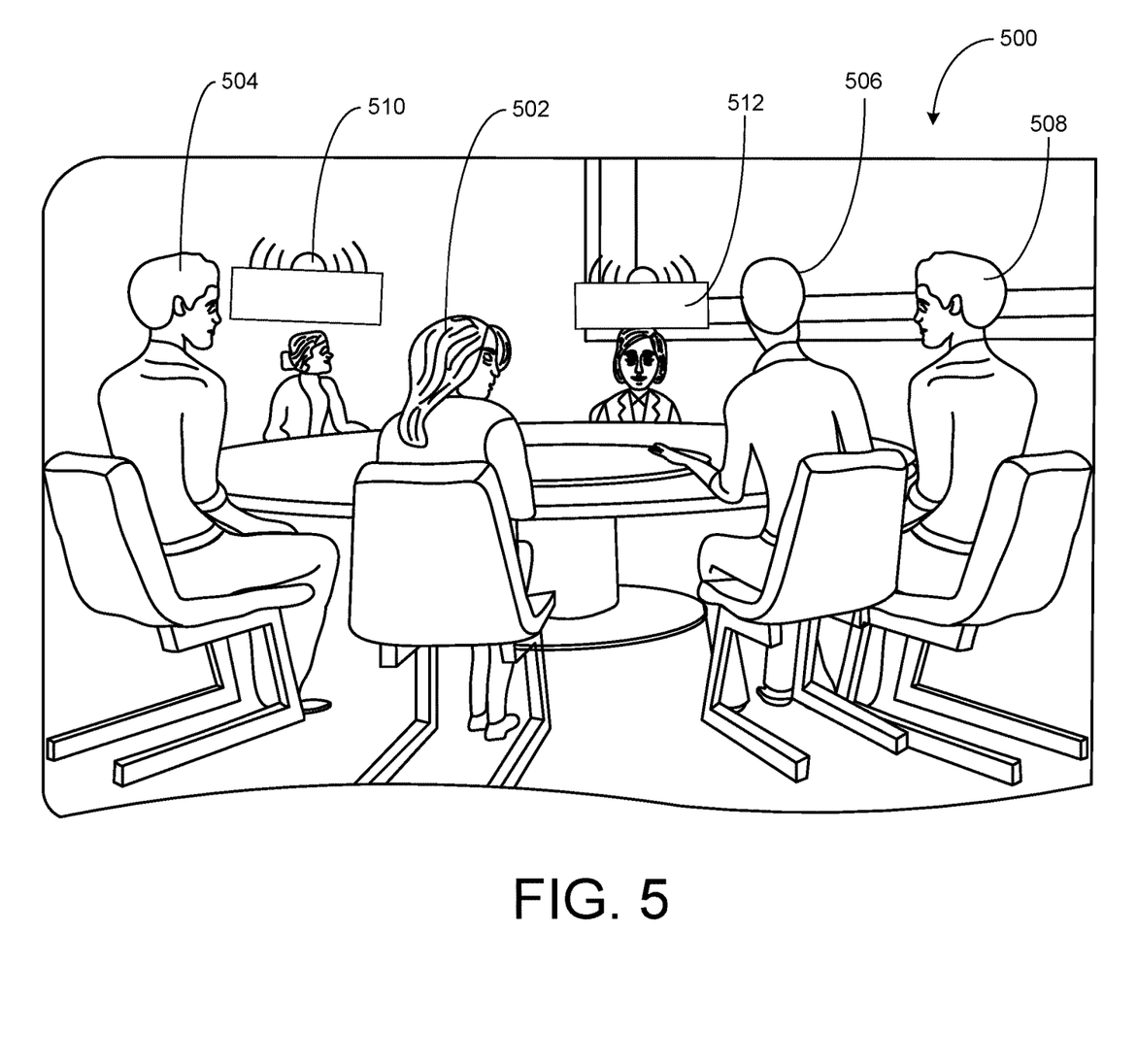
FIG. 5 illustrates a second example use case scenario for the system of FIG. 1.

FIG. 5 illustrates a second example use case scenario for the system of FIG. 1. FIG. 5 illustrates a virtual conference scenario 500 in which a user 506 engages in interactions with virtual users 502, 504, 508, 510, and 512. For example, the user 506 may be wearing smartglasses, such as those shown in FIGS. 8A and 8B. The room in which the virtual conference is being held may provide the spatial region 106 of FIG. 1.

For example, FIG. 5 may illustrate a world-locked scenario, in which the virtual users 502, 504, 508, 510, and 512 are positioned with respect to a coordinate system that is defined with respect to real-world objects (e.g., the illustrated table, chairs, floor, and/or walls). Thus, in the example, the smartglasses of FIGS. 8A and 8B, worn by the user 506, may create the illusion for the user 506 that the virtual users 502, 504, 508, 510, corresponding to the virtual users 112, 120 of FIG. 1, are positioned (seated) around a central table, while corresponding actual users (corresponding to users 110, 118 of FIG. 1) are remotely located.

In FIG. 5, virtual users 510, 512 may be speaking to one another and/or to the group, and the user 506 may be facing the virtual users 510, 512. That is, the user 506 may have both the virtual users 510, 512 within a field of view of the user 506, and gaze tracking may determine that the user 506 is alternately gazing at the virtual users 510, 512. Consequently, as explained above, audio from the virtual users 510, 512 may be processed with a relatively high order ambisonics encoding, while any ancillary audio from users 502, 504, 508 may be processed with a relatively low order ambisonics encoding.

Thus, as a field of view and/or gaze of the user 506 is directed at different ones of the virtual users 502, 504, 508, 510, 512, orders of corresponding ambisonics encodings may be updated, as well. In this way, the user 506 may be provided with high quality, low latency, spatially accurate audio reproductions, while minimizing resource consumption at the smartglasses of the user 506.

Figure 6:
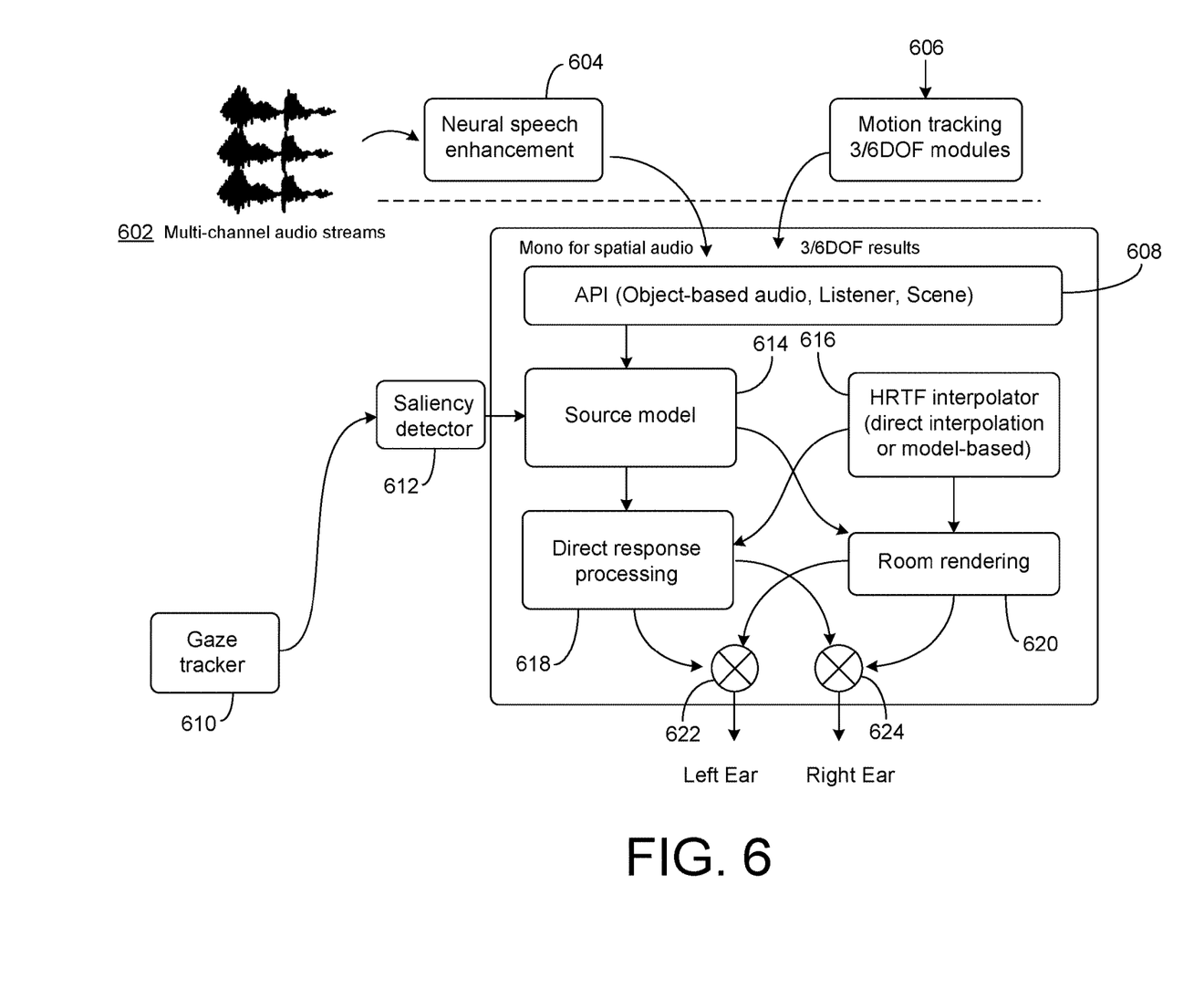
FIG. 6 is a block diagram of a more detailed example implementation of the system of FIG. 1.

FIG. 6 is a block diagram of a more detailed example implementation of the system of FIG. 1. In FIG. 6, audio streams 602 are received, corresponding to audio signals, e.g., from the various virtual users 502, 504, 508, 510, and 512 of FIG. 5. Neural speech enhancement 604 may be implemented to improve a quality of speech received in the audio streams 602 (e.g., enhancing included speech relative to any background noise that may also be included in the audio streams 602).

Figure 8A:
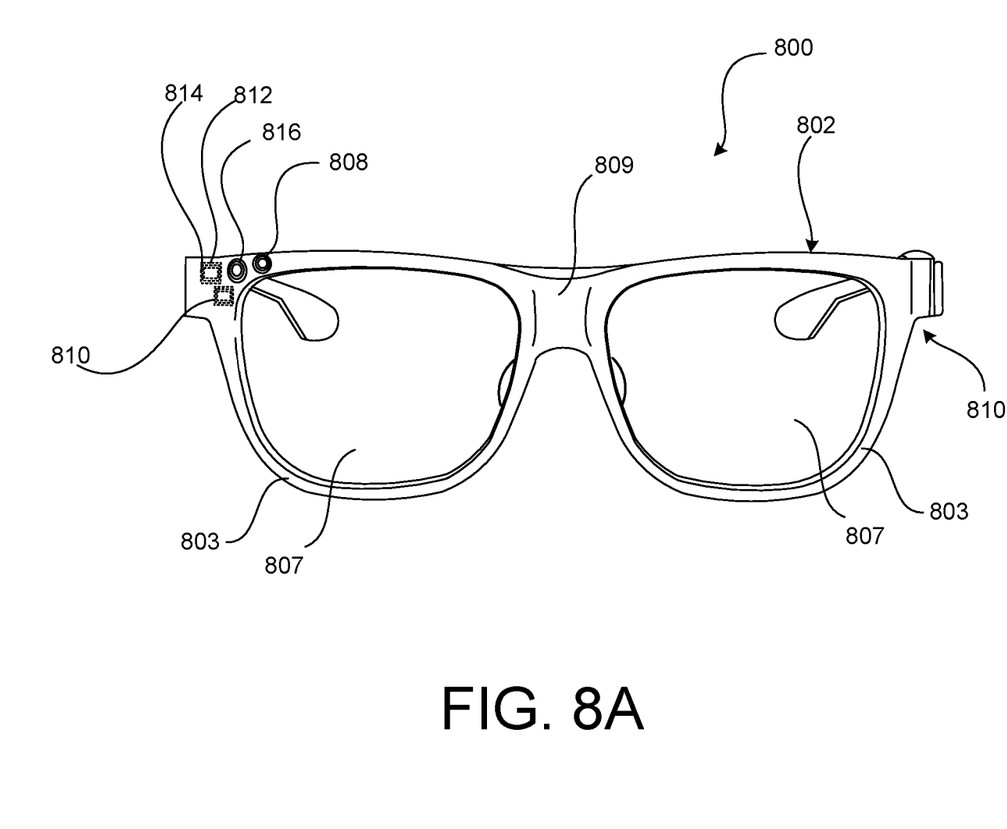
FIGS. 8A and 8B illustrate front and rear views of an example implementation of a pair of smartglasses.
Figure 8B:
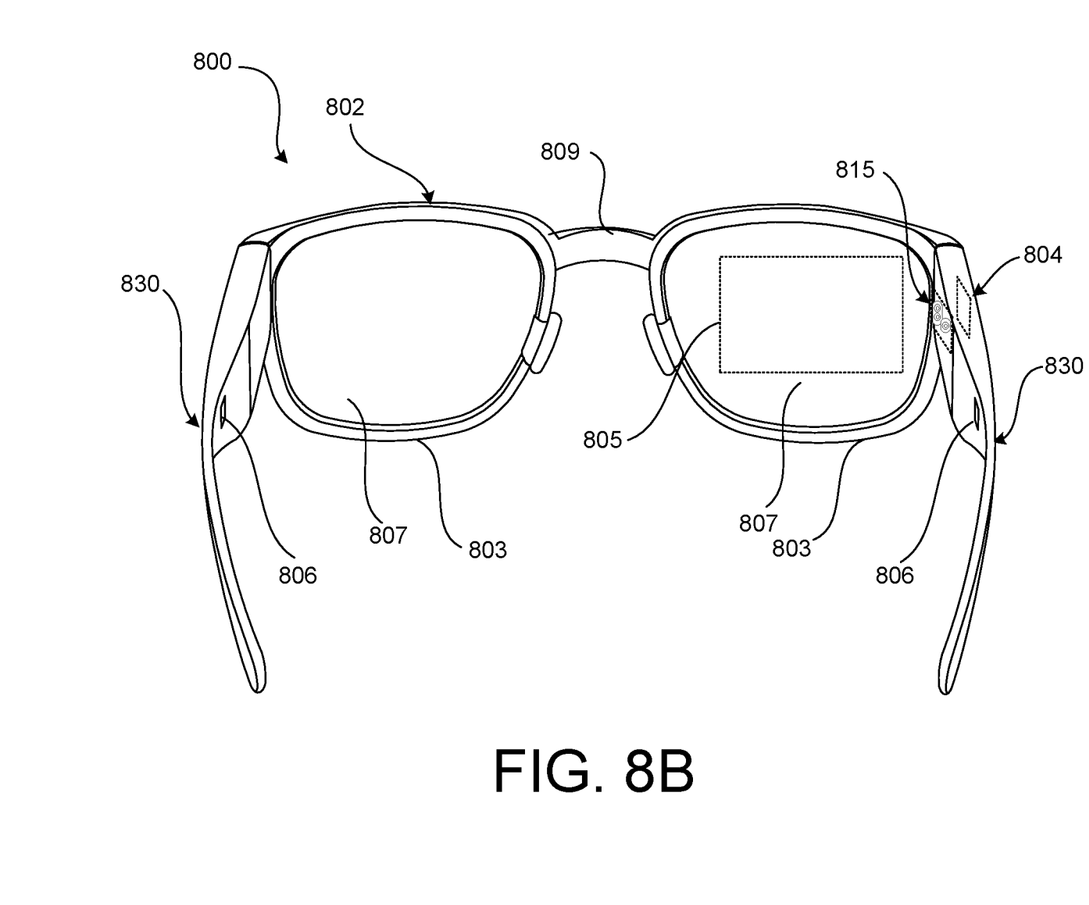

Motion tracking modules 606 may be implemented to provide 3 or 6 degree of freedom (DOF) motion tracking, e.g., using the smartglasses of FIGS. 8A and 8B. The motion tracking modules 606 may be used to provide data needed to determine or assign spatial coordinates with respect to the spatial region 106 of FIG. 1, e.g., the room of the virtual conference scenario 500 of FIG. 5.

An application program interface (API) 608 may be configured to receive the mono audio received from the neural speech enhancements 604 and the spatial information determined by the motion tracking modules 606, as shown. The API 608 may be further configured assign a position of each audio stream and each corresponding audio source within the provided spatial region. For example, the API 608 may be configured to associate each audio stream associated with each of the virtual users 502, 504, 508, 510, 512 with corresponding coordinates around the table of FIG. 5 and within the illustrated room of FIG. 5.

As described above, a gaze tracker 610 may be configured to provide gaze tracking results to a saliency detector 612, which may assign saliency scores to each of the audio streams 602. Then, a source model 614 may be configured to project individual ones of the audio streams 602 into the spatial region defined by the API 608, using different orders of ambisonics encoding that are determined by the saliency detector 612. That is, as described, the source model 614 may be configured to position each of the audio streams 602 at a corresponding set of spatial coordinates, and to reproduce sound from the assigned position using relatively higher order ambisonics encoding for sounds/positions assigned a high (e.g., above a threshold) saliency score, while using relatively lower order ambisonics encoding for sounds/positions assigned a low (e.g., below a threshold) saliency score.

In general, a transfer function characterizes an output response to an input response for a system. Therefore, a head related transfer function (HRTF) may be configured to model a response characterizing how sound received from an ear from a point in space is perceived. The HRTF may be defined as a ratio of a Fourier transform of a measure of sound pressure at an ear canal entrance and a Fourier transform of a measure of sound pressure within the head in the absence of the listener. A HRTF interpolator 616 may thus be configured to simulate, either by direct interpolation or model-based interpolation, the acoustic physics of received sound.

Direct response processing 618 refers to decoding of the ambisonics encoding of the source model 614 that simulates direct receipt of the virtual sound at a left ear headphone 622 and at a right ear headphone 624. In contrast, room rendering 620 refers to decoding that accounts for multipath, echo, and/or reverberation effects that may be present within a given room or other spatial region. As shown, both the direct response processing 618 and the room rendering 620 may be performed based on outputs of the source model 614, ad well as on outputs of the HRTF interpolator 616, to provide realistic audio at the left ear headphone 622 and the right ear headphone 624.

Figure 7:
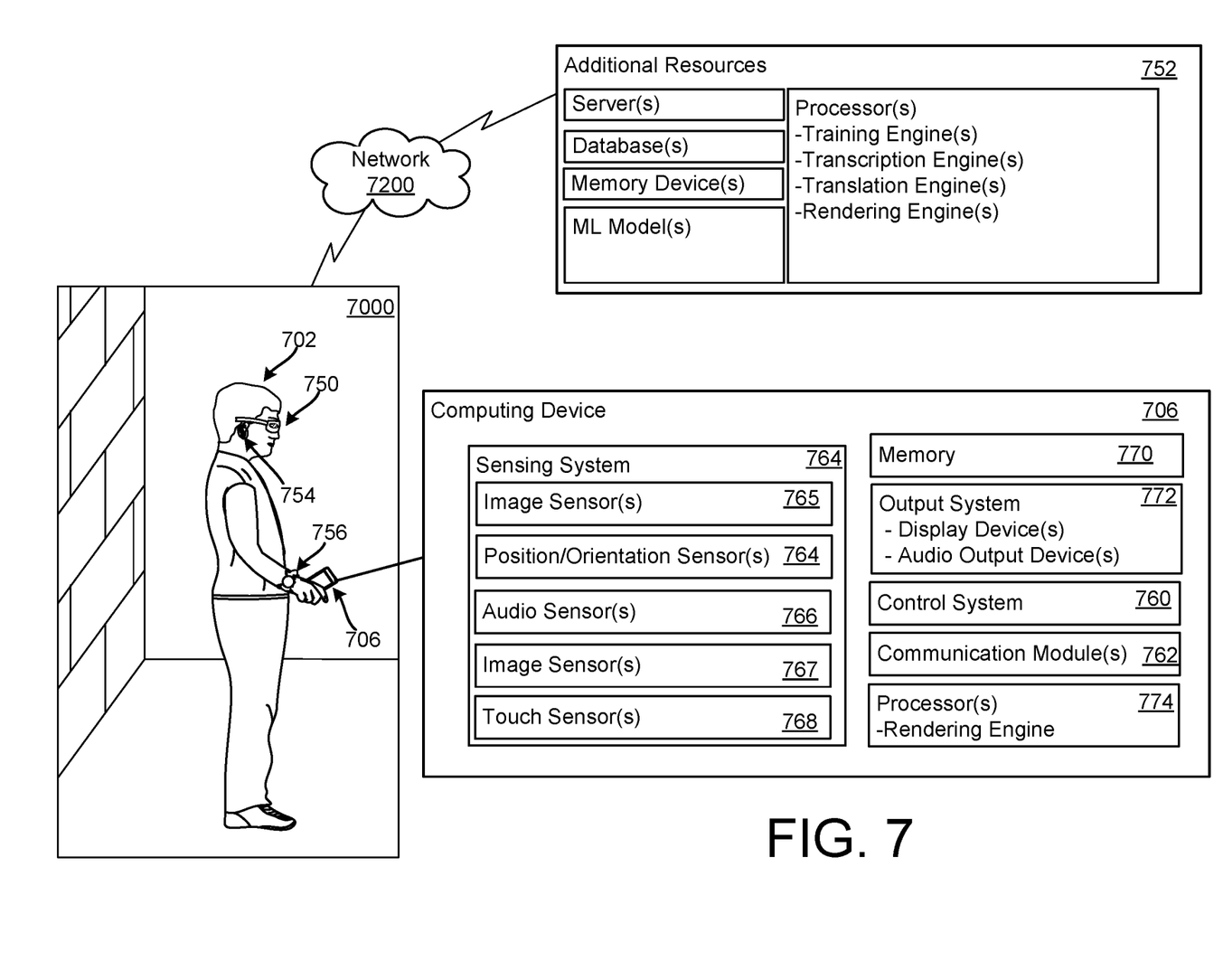
FIG. 7 is a third person view of a user in an ambient computing environment.

FIG. 7 is a third person view of a user 702 (analogous to the user 104 of FIG. 1) in an ambient environment 7000, with one or more external computing systems shown as additional resources 752 that are accessible to the user 702 via a network 7200. FIG. 7 illustrates numerous different wearable devices that are operable by the user 702 on one or more body parts of the user 702, including a first wearable device 750 in the form of glasses worn on the head of the user, a second wearable device 754 in the form of ear buds worn in one or both ears of the user 702, a third wearable device 756 in the form of a watch worn on the wrist of the user, and a computing device 706 held by the user 702. In FIG. 7, the computing device 706 is illustrated as a handheld computing device but may also be understood to represent any personal computing device, such as a table or personal computer.

In some examples, the first wearable device 750 is in the form of a pair of smart glasses including, for example, a display, one or more images sensors that can capture images of the ambient environment, audio input/output devices, user input capability, computing/processing capability and the like. Additional examples of the first wearable device 750 are provided below, with respect to FIGS. 8A and 8B.

In some examples, the second wearable device 754 is in the form of an ear worn computing device such as headphones, or earbuds, that can include audio input/output capability, an image sensor that can capture images of the ambient environment 7000, computing/processing capability, user input capability and the like. In some examples, the third wearable device 756 is in the form of a smart watch or smart band that includes, for example, a display, an image sensor that can capture images of the ambient environment, audio input/output capability, computing/processing capability, user input capability and the like. In some examples, the handheld computing device 706 can include a display, one or more image sensors that can capture images of the ambient environment, audio input/output capability, computing/processing capability, user input capability, and the like, such as in a smartphone. In some examples, the example wearable devices 750, 754, 756 and the example handheld computing device 706 can communicate with each other and/or with external computing system(s) 752 to exchange information, to receive and transmit input and/or output, and the like. The principles to be described herein may be applied to other types of wearable devices not specifically shown in FIG. 7 or described herein.

The user 702 may choose to use any one or more of the devices 706, 750, 754, or 756, perhaps in conjunction with the external resources 752, to implement any of the implementations described above with respect to FIGS. 1-6. For example, the user 702 may use an application executing on the device 706 and/or the smartglasses 750 to execute the sound generator 134 of FIG. 1.

As referenced above, the device 706 may access the additional resources 752 (which may include the cloud server 114 of FIG. 1) to facilitate the various audio reproduction techniques described herein, or related techniques. In some examples, the additional resources 752 may be partially or completely available locally on the device 706. In some examples, some of the additional resources 752 may be available locally on the device 706, and some of the additional resources 752 may be available to the device 706 via the network 7200. As shown, the additional resources 752 may include, for example, server computer systems, processors, databases, memory storage, and the like. In some examples, the processor(s) may include training engine(s), transcription engine(s), translation engine(s), rendering engine(s), and other such processors. In some examples, the additional resources may include ML model(s), such as the source model 138 of FIG. 1, the source model 614 of FIG. 6, or the HRTF interpolator 616 of FIG. 6.

The device 706 may operate under the control of a control system 760. The device 706 can communicate with one or more external devices, either directly (via wired and/or wireless communication), or via the network 7200. In some examples, the one or more external devices may include various ones of the illustrated wearable computing devices 750, 754, 756, another mobile computing device similar to the device 706, and the like. In some implementations, the device 706 includes a communication module 762 to facilitate external communication. In some implementations, the device 706 includes a sensing system 764 including various sensing system components. The sensing system components may include, for example, one or more image sensors 765, one or more position/orientation sensor(s) 764 (including for example, an inertial measurement unit, an accelerometer, a gyroscope, a magnetometer and other such sensors), one or more audio sensors 766 that can detect audio input, one or more image sensors 767 that can detect visual input, one or more touch input sensors 768 that can detect touch inputs, and other such sensors. The device 706 can include more, or fewer, sensing devices and/or combinations of sensing devices. Various ones of the various sensors may be used individually or together to perform the types of saliency detection described herein.

Captured still and/or moving images may be displayed by a display device of an output system 772, and/or transmitted externally via a communication module 762 and the network 7200, and/or stored in a memory 770 of the device 706. The device 706 may include one or more processor(s) 774. The processors 774 may include various modules or engines configured to perform various functions. In some examples, the processor(s) 774 may include, e.g., training engine(s), transcription engine(s), translation engine(s), rendering engine(s), and other such processors. The processor(s) 774 may be formed in a substrate configured to execute one or more machine executable instructions or pieces of software, firmware, or a combination thereof. The processor(s) 774 can be semiconductor-based including semiconductor material that can perform digital logic. The memory 770 may include any type of storage device or non-transitory computer-readable storage medium that stores information in a format that can be read and/or executed by the processor(s) 774. The memory 770 may store applications and modules that, when executed by the processor(s) 774, perform certain operations. In some examples, the applications and modules may be stored in an external storage device and loaded into the memory 770.

Although not shown separately in FIG. 7, it will be appreciated that the various resources of the computing device 706 may be implemented in whole or in part within one or more of various wearable devices, including the illustrated smartglasses 750, earbuds 754, and smartwatch 756, which may be in communication with one another to provide the various features and functions described herein.

An example head mounted wearable device 800 in the form of a pair of smart glasses is shown in FIGS. 8A and 8B, for purposes of discussion and illustration. The example head mounted wearable device 800 includes a frame 802 having rim portions 803 surrounding glass portion, or lenses 807, and arm portions 830 coupled to a respective rim portion 803. In some examples, the lenses 807 may be corrective/prescription lenses. In some examples, the lenses 807 may be glass portions that do not necessarily incorporate corrective/prescription parameters. A bridge portion 809 may connect the rim portions 803 of the frame 802. In the example shown in FIGS. 8A and 8B, the wearable device 800 is in the form of a pair of smart glasses, or augmented reality glasses, simply for purposes of discussion and illustration.

In some examples, the wearable device 800 includes a display device 804 that can output visual content, for example, at an output coupler providing a visual display area 805, so that the visual content is visible to the user. In the example shown in FIGS. 8A and 8B, the display device 804 is provided in one of the two arm portions 830, simply for purposes of discussion and illustration. Display devices 804 may be provided in each of the two arm portions 830 to provide for binocular output of content. In some examples, the display device 804 may be a see through near eye display. In some examples, the display device 804 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 807, next to content (for example, digital images, user interface elements, virtual content, and the like) output by the display device 804. In some implementations, waveguide optics may be used to depict content on the display device 804.

The example wearable device 800, in the form of smart glasses as shown in FIGS. 8A and 8B, includes one or more of an audio output device 806 (such as, for example, one or more speakers), an illumination device 808, a sensing system 810, a control system 812, at least one processor 814, and an outward facing image sensor 816 (for example, a camera). In some examples, the sensing system 810 may include various sensing devices and the control system 812 may include various control system devices including, for example, the at least one processor 814 operably coupled to the components of the control system 812. In some examples, the control system 812 may include a communication module providing for communication and exchange of information between the wearable device 800 and other external devices. In some examples, the head mounted wearable device 800 includes a gaze tracking device 815 to detect and track eye gaze direction and movement. Data captured by the gaze tracking device 815 may be processed to detect and track gaze direction and movement as a user input. In the example shown in FIGS. 8A and 8B, the gaze tracking device 815 is provided in one of two arm portions 830, simply for purposes of discussion and illustration. In the example arrangement shown in FIGS. 8A and 8B, the gaze tracking device 815 is provided in the same arm portion 830 as the display device 804, so that user eye gaze can be tracked not only with respect to objects in the physical environment, but also with respect to the content output for display by the display device 804. In some examples, gaze tracking devices 815 may be provided in each of the two arm portions 830 to provide for gaze tracking of each of the two eyes of the user. In some examples, display devices 804 may be provided in each of the two arm portions 830 to provide for binocular display of visual content.

The wearable device 800 is illustrated as glasses, such as smartglasses, augmented reality (AR) glasses, or virtual reality (VR) glasses. More generally, the wearable device 800 may represent any head-mounted device (TIMID), including, e.g., goggles, helmet, or headband. Even more generally, the wearable device 800 and the computing device 706 may represent any wearable device(s), handheld computing device(s), or combinations thereof.

Use of the wearable device 800, and similar wearable or handheld devices such as those shown in FIG. 7, enables useful and convenient use case scenarios of implementations of FIGS. 1-6. For example, as shown in FIG. 8B, the display area 805 may be used to display virtual users 502, 504, 508, 510, and 512 in the example of FIG. 5. More generally, the display area 805 may be used to provide any of the functionality described with respect to FIGS. 1-6 that may be useful in operating the sound generator 134.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the description and claims.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example implementations. Example implementations, however, may be embodied in many alternate forms and should not be construed as limited to only the implementations set forth herein.

The terminology used herein is for the purpose of describing particular implementations only and is not intended to be limiting of the implementations. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 130 degrees or at other orientations) and the spatially relative descriptors used herein may be interpreted accordingly.

Example implementations of the concepts are described herein with reference to cross-sectional illustrations that are schematic illustrations of idealized implementations (and intermediate structures) of example implementations. As such, variations from the shapes of the illustrations as a result, for example, of manufacturing techniques and/or tolerances, are to be expected. Thus, example implementations of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example implementations.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present implementations.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A computer program product, the computer program product being tangibly embodied on a non-transitory computer-readable storage medium and comprising instructions that, when executed by at least one computing device, are configured to cause the at least one computing device to:
   represent a first sound source at a first orientation and a second sound source at a second orientation within a spatial region defined with respect to a wearable device;
   receive a first sound at the wearable device from the first sound source;
   receive a second sound at the wearable device from the second sound source;
   perform a first ambisonics encoding of the first sound;
   perform a second ambisonics encoding of the second sound that is a lower order than the first ambisonics encoding;
   render the first sound at the first orientation within the spatial region, based on the first ambisonics encoding; and
   render the second sound at the second orientation within the spatial region, based on the second ambisonics encoding.

2. The computer program product of claim 1, wherein the first sound source is a first remote user represented as a first virtual user within the spatial region, and the second sound source is a second remote user represented as a second virtual user within the spatial region.

3. The computer program product of claim 1, wherein the instructions, when executed by the at least one computing device, are further configured to cause the at least one computing device to:
   assign a first saliency score to the first sound source;
   assign a second saliency score to the second sound source; and
   select the first ambisonics encoding and the second ambisonics encoding based on the first saliency score and the second saliency score, respectively.

4. The computer program product of claim 3, wherein the instructions, when executed by the at least one computing device, are further configured to cause the at least one computing device to:
   perform gaze tracking of a user for whom the first sound and the second sound are rendered; and
   assign the first saliency score and the second saliency score based on the gaze tracking.

5. The computer program product of claim 3, wherein the instructions, when executed by the at least one computing device, are further configured to cause the at least one computing device to:
   detect a field of view of a user for whom the first sound and the second sound are rendered; and
   assign the first saliency score and the second saliency score based on the field of view.

6. The computer program product of claim 3, wherein the instructions, when executed by the at least one computing device, are further configured to cause the at least one computing device to:
   determine that the first saliency score is above a saliency threshold; and
   perform the first ambisonics encoding of the first sound with a higher order than the second ambisonics encoding, based on the first saliency score being above the saliency threshold.

7. The computer program product of claim 1, wherein the wearable device includes a head mounted device (HMD).

8. The computer program product of claim 1, wherein the instructions, when executed by the at least one computing device, are further configured to cause the at least one computing device to:
   determine third sound received at the wearable device from a third sound source; perform the second order ambisonics encoding of the second sound and the third sound;
   aggregate the second ambisonics encoding and the third ambisonics encoding to obtain an aggregated ambisonics encoding;

sample and aggregate the first ambisonics encoding and the aggregated ambisonics encoding to obtain a sampled, aggregated ambisonics encoding; and render the first sound at the first orientation, the second sound at the second orientation, and the third sound at a third orientation within the spatial region, based on the sampled, aggregated ambisonics encoding.

9. The computer program product of claim 1, wherein the wearable device includes a virtual reality (VR) device, and wherein the spatial region includes a virtual spatial region generated by the VR device.

10. The computer program product of claim 1, wherein the instructions, when executed by the at least one computing device, are further configured to cause the at least one computing device to:

render the first sound and the second sound by performing an ambisonics decoding that maps the first ambisonics encoding and the second ambisonics encoding to binaural speakers of the wearable device.

11. A wearable device comprising:
at least one frame for positioning the wearable device on a body of a user;
at least one display;
binaural speakers;
at least one processor; and
at least one memory, the at least one memory storing a set of instructions, which, when executed, cause the at least one processor to:
represent, using the at least one display, a first sound source at a first orientation and a second sound source at a second orientation within a spatial region defined with respect to the wearable device;
receive a first sound at the wearable device from the first sound source;
receive a second sound at the wearable device from the second sound source;
perform a first ambisonics encoding of the first sound;
perform a second ambisonics encoding of the second sound that is a lower order than the first ambisonics encoding;
render, using the binaural speakers, the first sound at the first orientation within the spatial region, based on the first ambisonics encoding; and
render, using the binaural speakers, the second sound at the second orientation within the spatial region, based on the second ambisonics encoding.

12. The wearable device of claim 11, wherein the first sound source is a first remote user represented as a first virtual user within the spatial region, and the second sound source is a second remote user represented as a second virtual user within the spatial region.

13. The wearable device of claim 11, wherein the set of instructions, when executed by the at least one processor, are further configured to cause the wearable device to:
assign a first saliency score to the first sound source;
assign a second saliency score to the second sound source; and
select the first ambisonics encoding and the second ambisonics encoding based on the first saliency score and the second saliency score, respectively.

14. The wearable device of claim 13, wherein the set of instructions, when executed by the at least one processor, are further configured to cause the at least one processor to:
perform gaze tracking of the user; and
assign the first saliency score and the second saliency score based on the gaze tracking.

15. The wearable device of claim 13, wherein the set of instructions, when executed by the at least one processor, are further configured to cause the at least one processor to:
detect a field of view of the user; and
assign the first saliency score and the second saliency score based on the field of view.

16. The wearable device of claim 13, wherein the set of instructions, when executed by the at least one processor, are further configured to cause the at least one processor to:
determine that the first saliency score is above a saliency threshold; and
perform the first ambisonics encoding of the first sound with a higher order than the second ambisonics encoding, based on the first saliency score being above the saliency threshold.

17. The wearable device of claim 11, wherein the wearable device includes a head mounted device (HMD).

18. A method comprising:
representing a first sound source at a first orientation and a second sound source at a second orientation within a spatial region defined with respect to a wearable device;
receiving a first sound at the wearable device from the first sound source;
receiving a second sound at the wearable device from the second sound source;
performing a first ambisonics encoding of the first sound;
performing a second ambisonics encoding of the second sound that is a lower order than the first ambisonics encoding;
rendering the first sound at the first orientation within the spatial region, based on the first ambisonics encoding; and
rendering the second sound at the second orientation within the spatial region, based on the second ambisonics encoding.

19. The method of claim 18, further comprising:
assigning a first saliency score to the first sound source;
assigning a second saliency score to the second sound source; and
selecting the first ambisonics encoding and the second ambisonics encoding based on the first saliency score and the second saliency score, respectively.

20. The method of claim 19, further comprising:
performing gaze tracking of a user for whom the first sound and the second sound are rendered; and
assigning the first saliency score and the second saliency score based on the gaze tracking.

* * * * *